United States Patent [19]
Matthews et al.

[11] Patent Number: 5,379,806
[45] Date of Patent: Jan. 10, 1995

[54] FIBER GLASS AIR DUCT WITH COATED INTERIOR SURFACE CONTAINING AN ORGANIC BIOCIDE

[75] Inventors: Kent R. Matthews, Littleton; Eric G. Schakel, Sedalia; Ricardo R. Gamboa, Littleton, all of Colo.

[73] Assignee: Schuller International, Inc., Denver, Colo.

[21] Appl. No.: 67,769

[22] Filed: May 26, 1993

[51] Int. Cl.⁶ .................................................. F16L 9/14
[52] U.S. Cl. ..................................... 138/149; 138/103; 138/110; 138/137; 138/141; 138/177; 138/178
[58] Field of Search ............... 138/137, 141, 145, 149, 138/DIG. 2, 110, 103, 177, 178

[56] References Cited

U.S. PATENT DOCUMENTS

| | | | |
|---|---|---|---|
| 2,906,317 | 9/1959 | Keyes | 138/149 |
| 3,092,529 | 6/1963 | Pearson | 138/149 |
| 3,216,459 | 11/1965 | Schroeder et al. | 138/149 |
| 3,557,840 | 1/1971 | Maybee | 138/149 |
| 3,628,572 | 12/1971 | Shannon | 138/149 |
| 3,654,966 | 4/1972 | Waksman | 138/149 |
| 3,818,948 | 6/1974 | Hedges | 138/149 |
| 3,926,894 | 12/1975 | Clark | 138/DIG. 1 |
| 4,310,585 | 1/1982 | Shannon | 138/149 |
| 4,395,159 | 7/1983 | Karuks et al. | 138/110 |
| 4,557,297 | 12/1985 | Montana | 138/149 |
| 4,990,370 | 2/1991 | Terry et al. | |

FOREIGN PATENT DOCUMENTS 866949  5/1961  United Kingdom .............. 138/149

OTHER PUBLICATIONS

Owens-Illinois Glass Company Brochure, "Fiberglass Insulation For Industrial Uses", Jan. 26, 1939.

Primary Examiner—James E. Bryant, III
Attorney, Agent, or Firm—Cornelius P. Quinn

[57] ABSTRACT

A rigid fiber glass air duct for conveying an airstream has an interior surface, adapted to be in contact with the airstream, which is coated with a polymeric coating with an organic biocide. The polymeric coating has a dry solids content of between 10 and 20 grams per square foot of duct board surface and retains its abrasion strength and puncture resistance whereby the interior surface of the duct can be cleaned by conventional industrial or commercial cleaning methods while in service without exposing glass fibers to the airstream.

4 Claims, 1 Drawing Sheet

FIBER GLASS AIR DUCT WITH COATED INTERIOR SURFACE CONTAINING AN ORGANIC BIOCIDE

BACKGROUND OF THE INVENTION

The present invention relates to cleanable, fiber glass ducts for conveying air which are used in heating, ventilating and air conditioning systems.

It is common practice to use fiber glass duct liners in heating, ventilating and air conditioning systems. As discussed in Terry et al, U.S. Pat. No. 4,990,370, column 1, lines 33–50, the interior surfaces of these fiber glass duct liners, which are relatively low in density when compared to fiber glass ducts, are either coated with a rubberized or plastic material or a facing is applied to the surface to prevent portions of the duct liner from breaking away or flaking off due to erosion by the air stream within the duct liner. Without the coating, loose particles of dust and dirt, in the air stream being conveyed, strike the interior surface of the duct liner causing erosion so that portions of the duct liner break away or flake off. However, the coating is only sufficient to prevent the erosion of the interior surface of the duct liner and does not form the smooth, durable surface required to withstand the cleaning of the interior surface of the duct liner by maintenance personnel using conventional commercial cleaning methods.

Fiber glass air ducts are also used in heating, ventilating and air conditioning systems. These air ducts are formed from high density fiber glass duct boards having a density of at least 3.5 pounds per cubic foot as compared to a density of 1.5 pounds per cubic foot for low density duct liners. The duct boards are formed by compressing blankets of resin coated glass fibers to an appropriate thickness and density and curing the resin binder. Due to the high density and the heavy resin binder content on the interior surface of the duct boards forming the air duct, the high density fiber glass ducts formed from the duct boards do not require a coating or facing on their interior surfaces to prevent erosion by the air stream. However, like the duct liners discussed above, the prior art air ducts have not had an interior surface suitable for cleaning by conventional industrial or commercial cleaning methods.

With recent developments in air quality measurement devices and an overall increase in environmental awareness, there has been an increased interest in the air quality in all types of buildings employing heating, ventilating and air conditioning systems. While in service, especially when the air filtration system is not properly maintained, the interior air conveying surfaces of air ducts pick up dust and become increasingly dirty. The accumulation of dust on the interior surfaces of ducts uses been identified as a possible nutrient source for microbiological growth. The growth of microbes in an a heating, ventilating and air conditioning system may compromise the indoor air quality of the building or home served by the system. Accordingly, there has been a need to provide a cleanable interior surface for air ducts.

The interior surfaces of sheet metal air ducts are often cleaned with rotating brushes having plastic bristles six inches to a foot long. Another method of cleaning air ducts uses industrial type vacuum cleaners. In addition, it is common to clean the interior surfaces of sheet metal air ducts with liquid chemical disinfectants to remove microbiological growth from the interior surface of the duct.

Fiber glass air ducts not only effectively convey the air in a heating, ventilating and air conditioning system, they also, unlike sheet metal air ducts, provide an acoustical benefit by reducing the transmission of sound. While fiber glass does not support mold growth and the use of liquid chemical disinfectants on the interior surface of fiber glass ducts is not necessary, the cleaning of uncoated fiber glass air ducts to remove dust and dirt by the methods discussed above can result in damage to the interior surface of an uncoated fiber glass air duct by puncturing and/or wearing away the interior surface of the duct. Accordingly, there has been a need to provide a cleanable interior surface for fiber glass air ducts that can be subjected to normal commercial cleaning methods.

SUMMARY OF THE INVENTION

The high density fiber glass air duct of the present invention has a polymeric coating on its interior surface to permit the interior surface of the air duct to be cleaned during service by conventional commercial or industrial cleaning methods. To form the smooth, cleanable, durable surface required, the polymeric coating has a dry solids content of between 10 and 20 grams per square foot of duct board surface. This assures that the polymeric coating has the necessary thickness to retain its abrasion strength and puncture resistance even when subjected to temperatures of 250 degrees Fahrenheit for long periods of time.

The polymer coating, used in the present invention, is provided with an organic biocide that prevents microbiological growth on the coating surface which forms the interior surface of the air duct. With the organic biocide, the coating surface does not require cleaning with liquid chemical disinfectants thereby eliminating the need for this cleaning procedure with a resulting savings in cleaning and maintenance costs.

It was also learned that the acoustical sound absorbing properties of the air ducts improved for better than 90% of the air ducts fabricated with the high density, polymeric coated duct boards of the present invention.

Thus, the air duct of the present invention, with its polymeric coating, provides a cost effective solution to the need for fiber glass air ducts which can be cleaned without damage by the conventional cleaning methods employed in the industry. In addition, the coated fiber glass air ducts of the present invention eliminate the need for cleaning the interior of the air duct with liquid chemical disinfectants and in most instances improve the acoustical performance of the product.

DETAILED DESCRIPTION OF THE INVENTION

Figure 1:
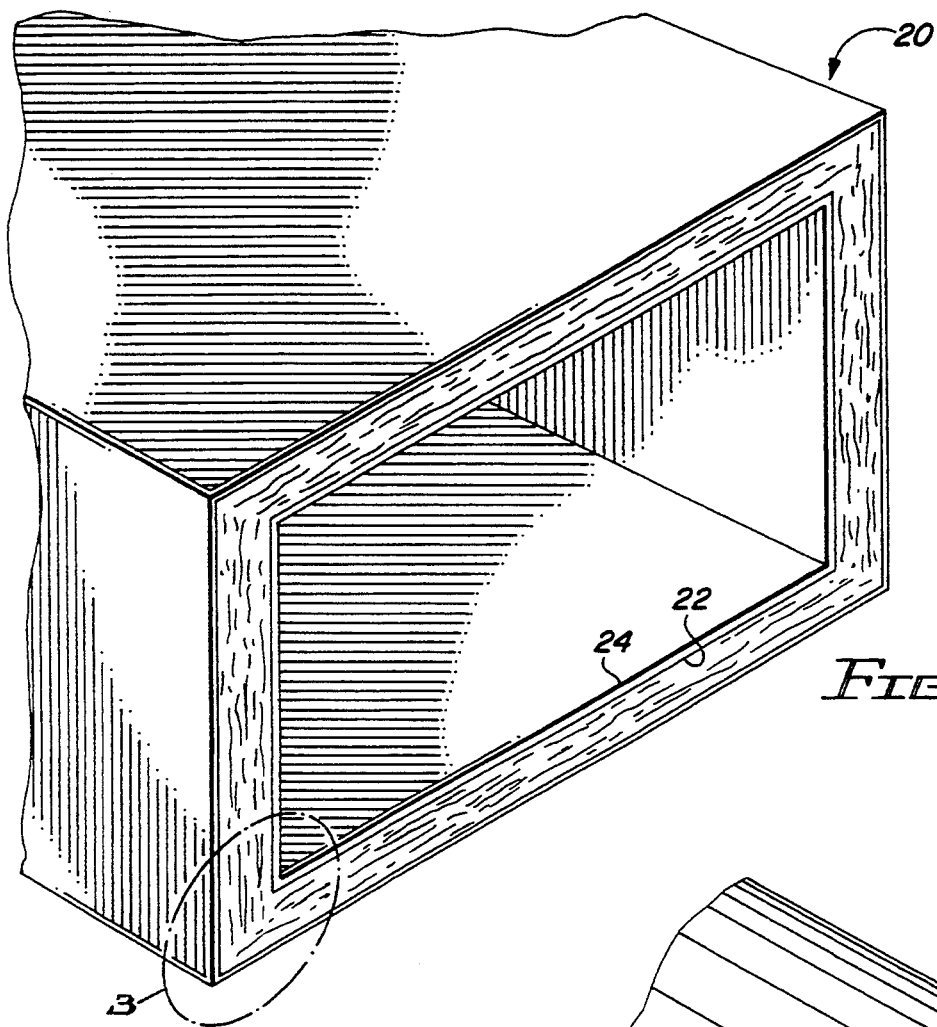
FIG. 1 is a perspective view showing a cleanable rectangular duct of the present invention in cross section.
Figure 2:
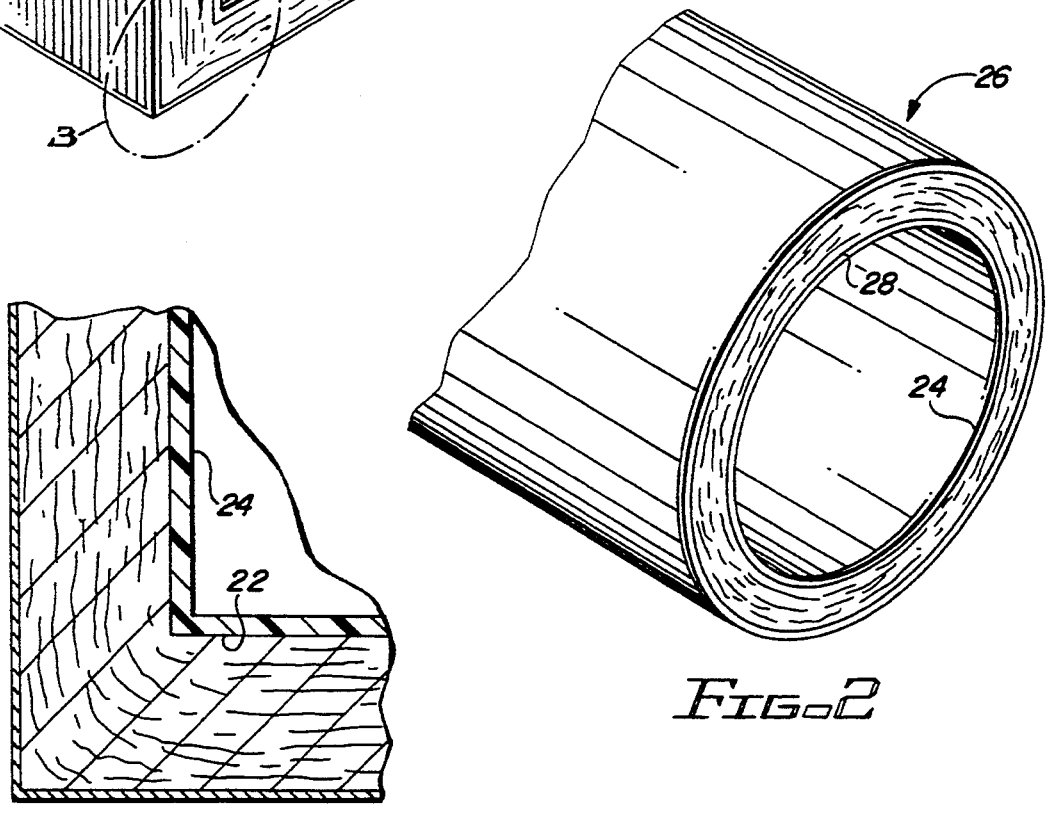
FIG. 2 is a perspective view showing a cleanable round, tubular duct of the present invention in cross section.
Figure 3:
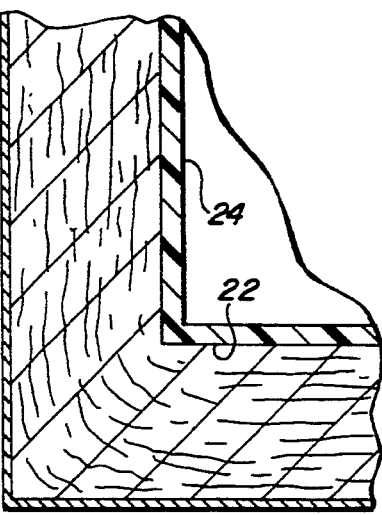
FIG. 3 is an enlarged detail f the portion of FIG. 1 encircled and labeled 3, illustrating in greater detail the polymeric coating layer on the interior surface of the fiber glass air duct.

FIG. 1 shows a rigid, air duct 20 having a rectangular cross section and FIG. 2 shows a rigid tubular air duct 26. Both ducts 20 and 26 are made of high density fiber glass duct board which typically has a density of between 3.5 and 5.5 pounds per cubic foot. The interior surfaces 22 and 28 of the ducts are provided with a polymeric coating 24 to permit the interior surface to be cleaned while in service without exposing glass fibers to the air stream. FIG. 3 shows a corner of the glass fiber air duct 20 of FIG. 1 with the coating 24 on the interior surface of the air duct.

One polymeric coating, that can be used in the present invention, is an acrylic foam coating such as EVODE TANNER XA 9900 Series coating. The coating 24 is applied in accordance with the disclosure of Terry et al, U.S. Pat. No. 4,990,370 which is incorporated herein by reference. To assure that the polymeric coating 24 has the required thickness to provide a smooth, durable surface capable of withstanding normal industrial or commercial cleaning procedures, the coating 24 applied to the interior surface 22 or 28 is between 10 and 20 grams dry solids per square foot of duct board surface and preferably, between 12 and 16 grams dry solids per square foot of duct board surface. Other polymeric coating materials can be used provided such materials have the abrasion strength and puncture resistance, as tested below, of the EVODE TANNER XA 9900 Series coating and retain those physical properties while in service.

The polymeric coating 24 used in the present invention retains its abrasion strength and puncture resistance after being subjected to a temperature of 250 degrees Fahrenheit for 60 days. After being subjected to the heat test, a fiber glass duct board, having a coating between 10 and 20 grams dry weight per square foot of duct board surface, exhibits no significant loss abrasion characteristics or puncture resistance.

The abrasion resistance of the coated duct board is tested by firmly dragging the edge of a coin over the surface of the coating 24 after the heat test to determine if the heat test has caused the coating to become brittle whereby it will flake off when subjected to a scraping action. There should be no flaking off of the coating during this test. The puncture resistance the coating 24 is measured by applying a force on and perpendicular to the surface of the coating after the heat test. The perpendicular force is applied with a one inch diameter steel ball that is pressed against the coating surface under a specific pressure. The coatings 24 of the present invention are normally able to withstand a pressure of 20 pounds without puncturing. If there is a failure or puncture at a pressure of 15 pounds or less, the coating is unacceptable.

The polymeric coatings 24 of the present invention are also provided with a commercially available organic biocide system to prevent the growth of microbes on the interior surface of the coated fiber glass air ducts 20 and 26. As mentioned above, this eliminates the need for cleaning the interior surfaces of the air ducts with the liquid chemical disinfectants that are employed to clean the interior surfaces of sheet metal air ducts to remove microbe growth from the surface of the sheet metal air ducts.

The commercially available organic biocide systems used in the coating 24 of the present invention must meet the following tests: ASTM 1071 Part 7.3 (fungi resistance); ASTM G21 (fungi resistance); ASTM G22 (bacterial resistance); and Underwriters Laboratory UL 181 Part 12 (mold growth and humidity test).

The sound absorption coefficients (ASTM C-423; Type A Mounting) of uncoated MICRO-AIRE duct boards were compared with the sound absorption coefficients of the coated MICRO-AIRE duct boards of the present invention. The results are as follows:

| BOARD TYPE | NRC UNCOATED | NRC COATED |
| --- | --- | --- |
| 475 | 0.65 | 0.80 |
| 800 1" | 0.75 | 0.75 |
| 800 1.5" | 0.90 | 0.95 |

In two of the three tests the coating measurably improved the acoustical sound absorbing properties of the air duct boards. The products with the improved sound absorption properties comprise better than 90% of the product produced and sold for this product line. Thus, the sound absorbing properties of essentially the entire product line were enhanced through the use of the coating of the present invention.

While the fiber glass air ducts 20 and 26, shown in FIGS. 1 and 2, have rectangular and circular cross sections, respectively, the coated duct board of the present invention can have other cross sectional configurations.

We claim:

1. A fiber glass air duct for conveying air comprising: a rigid, fiber glass duct formed of duct board having a density of at least 3.5 pounds per cubic foot; said fiber glass duct having an interior surface adapted to be in contact with an air stream; said interior surface of said fiber glass duct having a polymeric coating layer comprising a polymeric coating on a surface of said duct board; said polymeric coating having a dry solids content between 10 and 20 grams per square foot of said duct board surface; said polymeric coating layer having an organic biocide to prevent microbiological growth on said interior surface of said fiber glass duct; and said polymeric coating layer retaining its abrasion strength and puncture resistance after being subjected to a temperature of 250 degrees Fahrenheit for 60 days whereby said interior surface of said fiber glass duct can be cleaned without exposing glass fibers to the air stream.

2. The fiber glass air duct of claim 1 wherein said duct is rectangular in cross section.

3. The fiber glass air duct of claim 1 wherein said duct circular in cross section.

4. The fiber glass air duct of claim 1 wherein said polymeric coating has a dry solids content of between 12 and 16 grams per square foot.

* * * * *